June 6, 1933.   W. T. BARKER, JR   1,913,302
HEAT CONTROL FOR WORKING END OF TANKS
Filed May 20, 1929   2 Sheets-Sheet 2
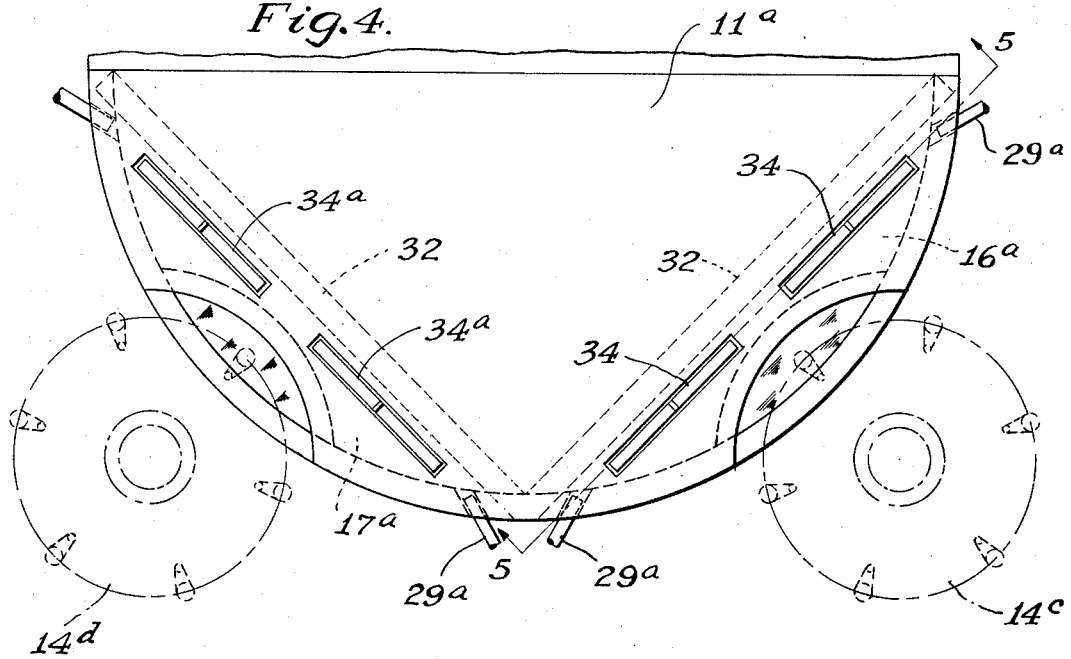
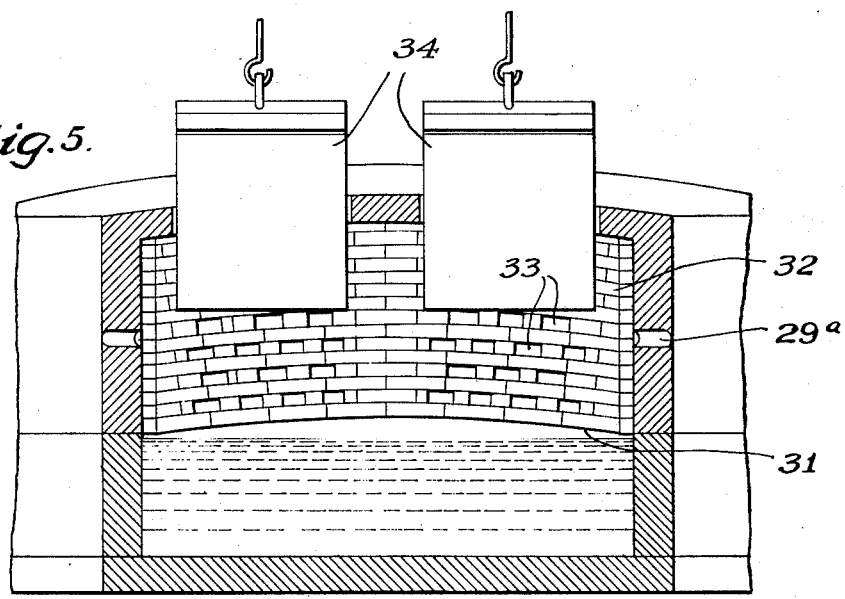
Witness:
G. A. Duburg
Inventor
William T. Barker, Jr.
by Brown & Parham
Attorneys.

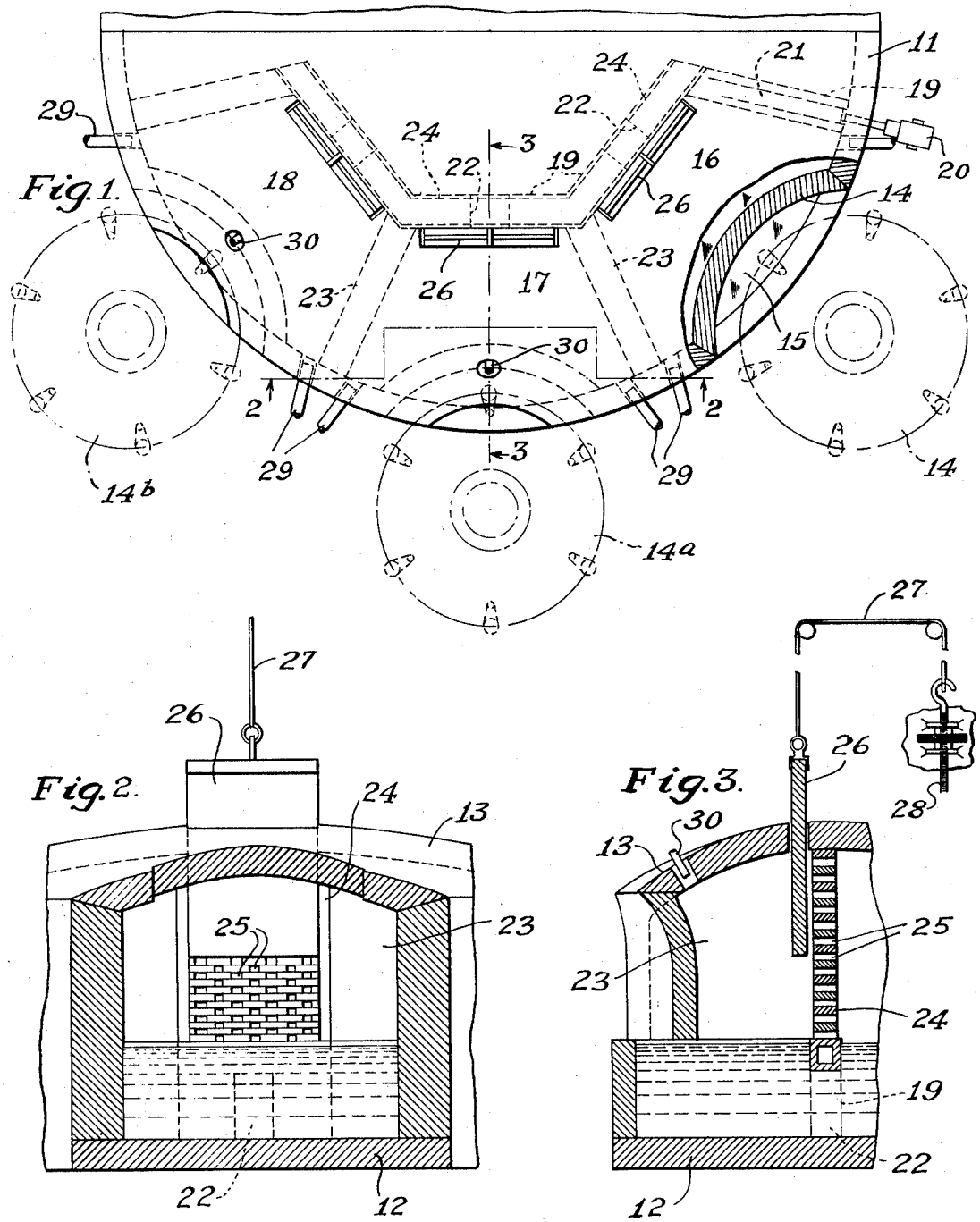

Patented June 6, 1933

1,913,302

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

HEAT CONTROL FOR WORKING END OF TANKS

Application filed May 20, 1929. Serial No. 364,389.

My invention relates to the arrangement of, and control of heat conditions in, the nose or working end of a continuous glass melting tank and more particularly to the individual control of the condition in separate workout portions of the nose of such tanks. My arrangements are particularly designed and adapted for use in tanks from which the glass is removed by a plurality of suction gathering machines or by the combination of suction gathering machines, hand shops and/or feeders.

In the collection of mold charges by the suction gathering method, it has been proposed, as in the patent to Cox, No. 1,212,189, to provide, directly at the working end of an ordinary commercial tank, a pool of glass having an exposed upwardly facing surface over which suction parison molds, mounted on a forming machine are successively passed and into which pool the molds are successively dipped to gather their charges by suction. It is generally essential in such practice that some means be employed to present the glass to the machine at the temperature best suited to the formation of the particular article upon which the machine is working. It is also essential that the chilled spots caused by the successive dipping of the mold and severing of the "bit" from the glass gathered in the mold be disposed of by a proper circulation of the glass. This circulation may be accomplished by particular circulating means or by the provision of suitable conditions co-acting with the movement of the molds through the glass to set up a horizontal circulation of this cold glass away from the gathering spot. For example, the movement of the molds may be depended on, as is illustrated in the aforesaid patent to Cox, to cause a horizontally circulating movement of the glass.

In the event that a single suction gathering machine is used upon a furnace and no other gathering operations are performed at that furnace, the furnace, as a whole, may be controlled to present the glass at the gathering point at the proper temperature for the particular article to be made. This temperature, as is well known, will be varied for changes in the type or size of molds used upon the machine. The glass must be run colder for heavy than for light ware. It is, however, not an economical process to employ but a single gathering device upon a furnace, and hence the control of the furnace to suit one machine only cannot usually be followed in commercial practice.

Furthermore, if two or more machines, whether all of the suction or including other types, are to be supplied from the same furnace, the circulating "bits" of cold glass resulting from the gathering operation of each suction machine tend to move out of their desired circulatory path, and to interfere with the proper operations of the other machines upon the same tank. For example, if a tank is operated with a suction gathering machine and a gob feeder, the drag caused by the gob feeder tends to draw the cold "bits" resulting from the suction gathering operations into the forehearth of the gob feeder, with the result that the operations of that feeder are impaired. A similar condition will exist when two or more suction machines are used upon the same tank nose.

My invention provides means for overcoming these difficulties, and for permitting the use of a plurality of gathering mechanism, some of which are of the suction type, upon the same furnace nose.

Among the objects of my invention are to provide a controlled heat separation of selected portions of the tank nose to provide individual control of the heat condition of the glass supplied to each machine.

A further object of my invention is to provide not only the heat separation, but also a partial separation of the glass in the separate portions of the tank to avoid or minimize the disturbance of the circulatory movement of the cold "bits" of glass formed during the suction gathering operation.

Further objects of my invention will appear from the following specification when considered in connection with the accompanying drawings in which I have illustrated two forms of apparatus embodying structural features of my invention, and in which Figs. 1 to 3 inclusive illustrate in plan and section a preferred form of tank nose, and Figs. 4 and 5 a modified form providing a heat separation of selected portions of the nose without a separation of the glass in those portions from other portions in the tank nose.

Figure 1 is a plan view of the nose of the usual tank provided with the heat separating and partial glass separating features of my invention and showing provision for three suction gathering machines;

Fig. 2 is a vertical section on the line 2—2 of Fig. 1;

Fig. 3 is a vertical section on the line 3—3 of Fig. 1, omitting the parts of the gathering machine shown in Fig. 1;

Fig. 4 is a plan view of a tank nose adapted for use with two suction gathering machines and providing for separate heat control in the two sections to which these machines are applied; and Fig. 5 is a horizontal section on the line 5—5 of Fig. 4.

Generally speaking, my apparatus provides for a division internally of the tank nose of the space above the glass level and regulable heating means individual to the separated spaces whereby the heat condition and viscosity of the glass in each portion may be controlled. In the form shown in Figs. 1 to 3 inclusive, I have shown separating structure extending downwardly into the glass and providing a separate throat for the admission of glass to each of the separated compartments. With the apparatus of Figs. 1 to 3, I not only am able to accurately and separately control the heat condition in a separated portion of the nose of the tank, but I retain control of the circulation of the glass within that portion independently of the circulation in the other portions of the tank.

Referring particularly to Figs. 1 to 3, 11 represents the nose of the usual continuous glass melting tank or furnace having a glass containing lower portion 12 and an upper or crowned portion 13. Such tanks are separated by a bridge wall with a melting portion and a workout or nose portion on opposite sides of the bridge wall. As shown, the tank is providing glass for the operations of three suction gathering machines diagrammatically illustrated at 14, 14a and 14b. To permit the gathering of each of these machines, the glass containing portion 12 extends outwardly beyond the crown 13, which is cut back in arcuate form, as shown at 15a to expose a surface 15 of glass to the successively presented suction gathering molds. The nose of the tank is divided into three separately controlled portions or chambers 16, 17 and 18 below the glass line by suitable walls of refractory and glass resisting material 19. These walls are preferably of high quality flux blocks, as for example, those described in the Australian patent to Hartford-Empire Company No. 6894 of 1927, or in the United States patent to Paul G. Willetts No. 1,605,885.

If desired, these walls may be cooled by suitable cooling means indicated at 20 as an air blower designed to blow cooling air into an internal space 21 within the walls. The walls 19 completely separate the bodies of glass in the chambers 16, 17 and 18 from each other and from that in the tank 11, save for the throat 22, Figs. 2 and 3, which establishes communication below the glass level, between the individual compartments 16, 17 and 18, and the general supply of glass in the nose 11. The walls 19 support refractory walls 23 and 24 preferably of silica brick or some other good heat resisting material, extending upward from above the glass line substantially to the crown 13. The wall 24 is preferably provided with openings or checkers 25 through which the heat radiated by the tank may pass into the compartments 16, 17 and 18. The extent to which radiation is permitted from the furnace into these compartments is controlled by the gates 26 which are adjustably mounted in front of the checkered walls 24, as by cables 27 and adjusting screws 28. The gates are also of good quality heat resisting material and are adapted to be suitably adjusted from a position covering all of the checkers to a position in which none of the checkers are covered. By this means, the amount of heat radiated from the furnace to the individual compartments 16, 17 and 18 may be controlled.

Each compartment is also supplied with suitable burners 29 adapted to locally heat the glass in the separate compartments. I also contemplate the provision of suitable cooling means, as blowers 30, individual to each compartment to aid in the individual control of the temperature of the glass in that compartment. If desired, suitable radiating openings may be provided in the crown of each of these individual portions in lieu of, or in addition to, the blowers 30.

In the form of my invention shown in Figs. 4 and 5, I have provided no separating structure below the glass level, but have provided for a separate heat control of the space in the nose of the tank individual to each of the two suction gathering machines 14c and 14d. Thus the nose 11a of the tank is provided with a heat shielding wall individual to each compartment 16a and 17a formed by springing arches 31 supporting a suitable checkered wall 32, the checkers 33 of which admit more or less radiated heat to the compartment 16a and 17a under the control of a pair of gates 34 and 34a, which may be mounted and adjusted in a manner similar to that indicated in connection with gates 26. Burners individual to the chambers 16a and 17a are indicated at 29a and if desired, cooling means similar to the blowers 30 or the heat radiating openings in the crown may be provided with this form, as with the form of Figs. 1 to 3.

In explaining the operation of the device shown in Figs. 1 to 3 inclusive, I will assume that the suction machine 14 is to be operated in the manufacture of small articles, as for example, three ounce bottles; the machine 14a to produce bottles of intermediate weight, as for example, ten ounce bottles; and the machine 14b to be operated in the manufacture of quart milk bottles, which weigh twenty-six ounces. The glass to be maintained in the compartment 16 must, for the best operation, be at a higher temperature than the glass in compartments 17 and 18 and the glass in the compartment 18 should be at a lower temperature than that in the compartment 17. As the glass in the nose 11 to be supplied to the compartments is at substantially the same temperature, it is obvious that the temperatures in the various compartments 16, 17 and 18 must be separately controlled. I will also assume that the particular apparatus depends upon the provision set forth in the aforesaid Cox patent to set up a circulation of glass chilled by the gathering operation away from the gathering spot by the movement of the molds through the glass, and to thus create a substantially horizontal circular movement of the glass in each compartment.

If the glass in the nose of the tank is at substantially the correct temperature for the operations of the machine 14a, the glass admitted through the throat into that compartment may require no special local heat treatment and I will assume that the condition of this glass will be properly maintained without the application of additional heat by the burners 20 or cooling air through the blower 30. The glass supplied to the compartment 16 will arrive in that compartment slightly colder than it should be for the best operation of the machine 14. This condition may be corrected locally by the upward adjustment of the gate 26 and/or by the application of additional heat through the burners 29 of that compartment. The glass delivered to the compartment 18 will arrive in that compartment at a temperature too high for the operation of the machine 14b, and hence this glass will require some cooling which may be accomplished by the lowering of the gate 26 of that compartment and/or by the blowing of cooling air upon the glass through the blower 30, or by opening the heat radiating openings in the crown of that compartment. The heat control so far described is equally applicable to the form of apparatus shown in Figs. 4 and 5.

Returning to consideration of the operation of the device in Figs. 1 to 3, the circulatory movement of the cold "bits" of glass set up during the operation in each of the compartments is localized to the compartment, as there is a complete separation of all of the surface glass in each compartment from the other compartments and from the nose 11. Thus the drag of the machine 14a, for example, will not bring the "bits" chilled by the molds of the machines 14 and 14b into the compartment 17 and into the path of the suction molds on the machine 14a.

In the form shown in Figs. 4 and 5, the surface glass is not completely separated in the compartments 16a and 17a, but the arrangement in that form of the apparatus, supplying as it does a separate control of the heat condition, will permit a greater heat condition in the nose 11a of the tank behind the shielding walls, which will effectively reheat the chilled "bits" which may pass out of one of the chambers toward the other, and to a modified extent, the advantages of the apparatus of Figs. 1 to 3 inclusive may be obtained by the use of the simpler apparatus of Figs. 4 and 5.

It is obvious that the use of my novel apparatus permits the use on the same tank of suction gathering machines and feeders such as those of the gob type or flow feed, as well as hand operations. It permits in all instances, the furnace to be run generally to accommodate the class of operation upon which the larger production is being had, and permits an individual regulation for other types of production. My invention may be modified in numerous particulars still within the spirit of my invention.

I claim:

1. In a glass melting tank separated by a bridge wall into a melting portion and a nose portion, and adapted for suction gathering machines, a plurality of suction gathering openings inside of the nose of the tank, a wall in the nose of the tank and individual to at least one of such gathering openings to determine the extent of radiation of heat from the body of the furnace to the portion of the nose containing the gathering opening, and means for controlling the extent to which the heat is radiated past said wall.

2. In a glass melting tank having a melting portion and a nose separated by a bridge wall, a plurality of suction gathering openings in the nose, and means inside the nose of the tank for heat separating a local portion of the nose adjacent at least one of such gathering openings from other portions of the tank.

3. In a glass melting tank having a melting portion and a nose separated by a bridge wall, a plurality of suction gathering openings in the nose, means inside of the nose for heat separating a local portion of the nose adjacent at least one of such gathering openings from other portions of the tank, and means for locally controlling the temperature in such local portions.

4. In a glass melting tank having a melting portion and a nose separated by a bridge wall, and having a plurality of feeding openings formed therein, at least one of which is adapted to supply glass for a suction gathering machine, means inside the nose for separating a local portion of the nose adjacent the suction gathering openings from the radiation of heat from other portions of the furnace, and means for varying the extent of such separation.

5. In a glass melting tank having a melting portion and a workout portion separated by a bridge wall and provided with a plurality of workout openings, one at least of which is adapted for use with a suction gathering device, and means in the nose of the tank for segregating the glass in a local portion of the nose adjacent the suction gathering opening to prevent passage of cold glass near the surface of the glass out of such local portion.

6. In a glass melting tank having a melting portion and a workout or nose portion separated by a bridge wall, a plurality of workout openings in the workout portion, one at least of which is adapted for use with a suction gathering machine, and partitions in the nose of the tank for localizing the circulation of cold glass formed on the surface of the glass by the suction gathering operation to a selected portion of the workout portion of the tank.

7. A glass melting tank, the nose proper of which is divided internally into a plurality of delivery compartments by partitions within the walls of the nose, each of said partitions having a plurality of apertures therein, and means for opening and closing the apertures in said partitions to control the temperature in said compartments.

8. A melting tank according to claim 7, in which the partitions extend below the surface of the glass to prevent chilled glass, which may be produced in the compartments, from flowing into the other part of the tank.

9. A melting tank according to claim 7, in which burners are provided for heating the separate compartments.

Signed at Hartford, Conn. this 16th day of May 1929.

WILLIAM T. BARKER, Jr.

CERTIFICATE OF CORRECTION.

Patent No. 1,913,302. June 6, 1933.

WILLIAM T. BARKER, JR.

It is hereby certified that error appears in the printed specification of the above numbered patent requiring correction as follows: Page 3, line 108, claim 1, for "inside of" read "in"; and line 109, for "in" read "inside of"; and that the said Letters Patent should be read with these corrections therein that the same may conform to the record of the case in the Patent Office.

Signed and sealed this 8th day of August, A. D. 1933.

M. J. Moore.

(Seal) Acting Commissioner of Patents.